United States Patent [19]

Kleinschmidt

[11] 3,837,426
[45] Sept. 24, 1974

[54] SOUND ABSORBING STRUCTURAL BLOCK

[75] Inventor: Klaus Kleinschmidt, Lexington, Mass.

[73] Assignee: Miguel C. Junger, Belmont, Mass.

[22] Filed: Jan. 4, 1974

[21] Appl. No.: 430,765

[52] U.S. Cl. ............................ 181/33 G, 52/145
[51] Int. Cl. ............................................. E04b 1/84
[58] Field of Search............ 181/33 G, 33 R, 30, 48; 52/144, 145

[56] References Cited
UNITED STATES PATENTS

| | | | |
|---|---|---|---|
| 1,825,770 | 10/1931 | Barnett | 181/33 G UX |
| 2,007,130 | 7/1935 | Munroe et al. | 181/33 G UX |
| 2,271,871 | 2/1942 | Newport et al. | 181/33 G UX |
| 2,745,276 | 5/1956 | Kuhlman | 181/33 G UX |
| 2,933,146 | 4/1960 | Zaldastani et al. | 181/33 G UX |
| 3,001,602 | 9/1961 | Taylor | 181/33 G UX |
| 3,177,970 | 4/1965 | Boschi | 181/33 G UX |
| 3,275,101 | 9/1966 | Morrissey et al. | 181/33 G UX |
| 3,506,089 | 4/1970 | Junger | 181/33 G UX |

FOREIGN PATENTS OR APPLICATIONS

| | | | |
|---|---|---|---|
| 606,872 | 10/1960 | Canada | 181/33 G |
| 959,117 | 5/1964 | Great Britain | 181/33 G |

*Primary Examiner*—Richard B. Wilkinson
*Assistant Examiner*—John F. Gonzales
*Attorney, Agent, or Firm*—Kenway & Jenney

[57] ABSTRACT

A sound absorbing block of molded structural material has a cavity that communicates with a region containing the sound to be suppressed through an elongated slot whose width decreases between the cavity and a section of constant width adjacent to the exterior surface of the block. Sound energy is dissipated by the air turbulence in the slot, particularly at the narrowest section, and within the cavity by multiple reflections. The inwardly flared structure of the slot achieves a significant increase in absorption in the mid to high frequency range as compared to conventional constant-width apertures having the same width, while being easier to manufacture and having fewer molding rejects than slots having an outwardly flared configuration.

9 Claims, 5 Drawing Figures

3,837,426

SOUND ABSORBING STRUCTURAL BLOCK

BACKGROUND OF THE INVENTION

This invention relates to a structural block having sound absorbing properties, and more specifically to a sound absorbing block of a molded structural material such as concrete of the type disclosed in U.S. Pat. No. 2,933,146, issued Apr. 19, 1960 to Zaldastani and Junger. This block is characterized by one or more cavities that communicate with a source of impinging noise through one or more parallel sided slots in the wall of the block facing the noise source. Sound energy is dissipated by a Helmholtz resonance effect within the slot and by a "black body" effect resulting from multiple reflection within the cavity.

The acoustical impedance that the cavity presents to the incoming noise, and thus its effectiveness as a sound absorber, is dependent on the frequency of the impinging sound. The impedance is resistive and small, and the absorption is at a peak, when the frequency is near the natural or Helmholtz resonance frequency. In practice this absorption peak typically occurs in the frequency range usually associated with machine noise (100 to 300 Hz., approximately). Frequently, however, it is more important to have a peak absorption at frequencies above this range, such as those associated with speech.

U.S. Pat. No. 3,506,089, issued Apr. 14, 1970 to Junger discloses a sound absorbing block utilizing a slot having outwardly flaring walls that decrease the cavity impedance, and therefore increase absorption, at frequencies above the Helmholtz resonance. The effect of the outward curving walls is analogized to that of an acoustical horn in that both increase sound transmission by matching the impedance of the cavity to that of the surrounding air. This slot configuration, however, is subject to manufacturing difficulties in that the molding process produces a significant number of rejects due principally to the deformation of the narrow portion of the slot as a male molding plug and fin are withdrawn. Another problem is that the wide slot opening invites the deposit of refuse in the cavity and the insertion of objects such as pencils that can damage sound absorbing filler materials. Still another problem lies in the restrictive placement of the slot near the center of a cavity to avoid impairing the mechanical strength of the block at the junction of the exterior walls and the end walls or a cavity partitioning wall. Yet another problem lies in the obvious disadvantage of a recessed surface for painting and cleaning purposes.

It is therefore a principal object of this invention to provide an improved block capable of greater sound absorption at frequencies above the Helmholtz resonance with a minimal aperture width at the exterior surface of the block.

Another object is to provide a sound absorbing block that is easily molded with a low incidence of rejects thereby reducing the cost of manufacture.

Still another object is to provide a sound absorbing block that discourages the insertion of objects into the cavity and protects the cavity filler material.

Yet another object is to provide a sound abosrbing block that permits a wide variation in the position of the slot with attendant advantages in design flexibility and aesthetics.

Still another object is to provide a sound absorbing block that is easy to paint and maintain.

SUMMARY OF THE INVENTION

The sound absorbing structural block of this invention has a slot or slots of improved configuration that increase the sound absorbing effectiveness of an enclosed cavity or cavities at frequencies above the Helmholtz resonance while presenting to the impinging noise a narrow slot aperture set in a flat exterior wall surface. The slot configuration, referred to generally as "inwardly flared," has a slot width that decreases with distance from the cavity to the exterior surface, except for a section of substantially constant width adjacent to the exterior surface. In one form, one side of the slot varies in width while the other side is flat and normal to the exterior surface, thereby allowing the slot to be positioned adjacent to an end wall or interior partition wall without impairing the structural integrity of the block. In another form, both slot walls flare away from a plane perpendicular to the exterior surface.

DETAILED DESCRIPTION OF THE PREFERRED EMBODIMENTS

Figure 1:
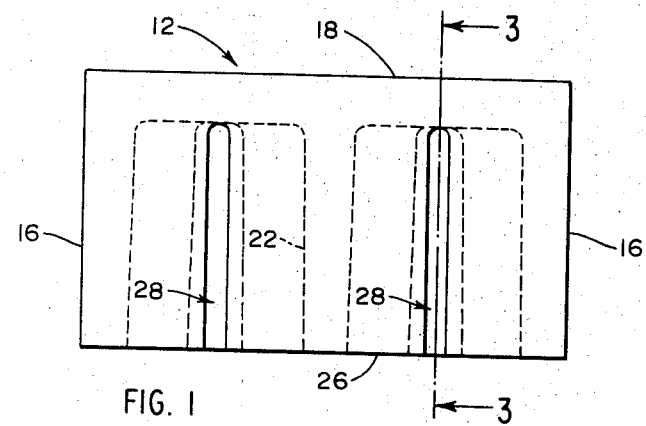
FIG. 1 is a front elevation of a masonry block embodying the invention.
Figure 3:
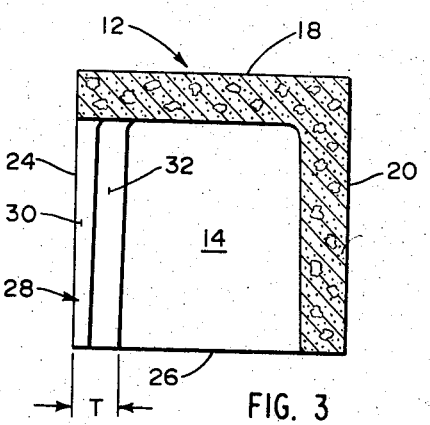
FIG. 3 is an elevation in section taken on the line 3—3 of FIG. 1.
Figure 2:
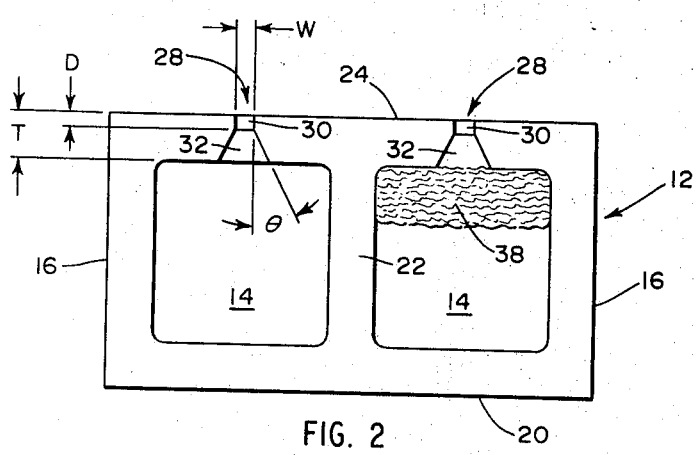
FIG. 2 is a bottom view of the block shown in FIG. 1.

A masonry block 12 according to this invention is shown in FIGS. 1–3. The block is manufactured in a conventional manner by means of a block mold adapted to pack a hardenable aggregate around a pair of tapered male plugs having a shape corresponding to that of the cavities 14. The masonry material can be any hardenable type such as concrete or the like. When the material hardens sufficiently, as by drying or heating, the mold elements are stripped. After curing, the block hardens into a load bearing structural element.

Figure 4:
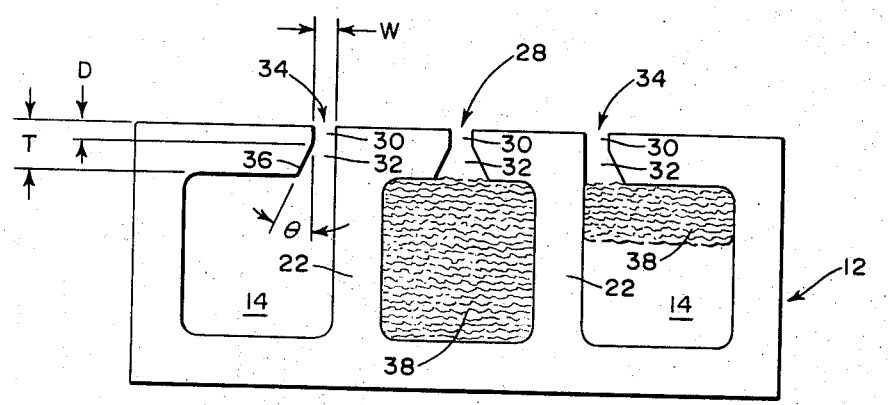
FIG. 4 is a bottom view of another masonry block embodying an alternate form of this invention.

The block has a pair of closed end walls 16, a third or top closed wall 18 contiguous with the wall 16, a fourth or back closed wall 20 contiguous with the walls 16 and 18, a closed partition wall 22 (or plural partition walls if there are more than two cavities, as shown in FIG. 4), and a fifth or front wall 24 opposite the fourth wall and intended to face the source of sound to be suppressed. A bottom plane 26, opposite the wall 18, is open to the cavities 14. It should be noted, however, that this opening is sealed by a top wall 18 and a layer of mortar when the blocks 12 are laid up in courses to form structures such as walls or ceilings.

The wall 24 has apertures in the form of flared slots 28 providing communication between the cavities 14 and the air propagating the sound to be suppressed. The combination of the cavity and the slot form an acoustical Helmholtz resonator. The slot extends in length from the bottom plane 26 to the interior surface of the top wall 18. As illustrated in FIG. 3, the width of the slot 28 at the exterior surface of the wall 24 is a constant. The width remains constant over a throat section 30 adjacent to the exterior surface and extending inwardly towards the cavity for a distance D. From the inner extremity of the section 30 to the cavity, the slot width uniformly increases. The side walls of this flared slot section 32 may take various cross-sectional shapes such as an arc of a circle or an exponential curve. In a preferred form, as illustrated, the width varies linearly between the inner edge of the section 30 and the cavity, with the overall slot having a generally Y-shaped configuration. This shape has the advantage of being simple to fabricate while providing the desired sound suppression qualities. Slots having the described configuration may be manufactured in the manner described in U.S. Pat. No. 3,506,089 to Junger. However, a significant advantage of the invention is that the molding fin which forms the inwardly flared slot is broadest at the point where it attaches to the male cavity plug. In contrast, the fin disclosed in Junger is narrowest at the attachment point, which results in molding rejects due to irregularities in the slot surface and the deterioration or collapse of the slot throat section.

Sound energy impinging on the wall 24 is dissipated in part by multiple reflections within the cavity 14 (the "black body" effect) and in part by losses within the slots 28 which are enhanced at frequencies for which there is an acoustical resonance. This resonance phenomenon, associated with the Helmholtz resonance effect, occurs when the frequency of the impinging sound is close to or at the natural frequency of the slot and the cavity. In physical terms it means that sound waves of maximum amplitude are oscillating within the slot.

The configuration of the slot 28 is a significant factor in both of these effects. With regard to the black body effect, the amount of energy dissipated within the cavity depends on the energy transmitted to it, which in turn depends on the acoustical impedance that the slot and cavity present to an impinging sound wave. With regard to the Helmholtz effect, the natural or resonant frequency of a Helmholtz resonator is inversely proportional to the square root of the mass of the air in the slot, which also depends on the shape of the slot. A principal feature of this invention is that the inwardly flaring configuration described above raises the Helmholtz frequency of the block 12 by reducing the effective air mass in the aperture 28 without sacrificing the impedance matching qualities of an outwardly flaring configuration. The air mass in the slot 28 is reduced as compared to a conventional parallel sided aperture because the significant air mass is only that found in the throat section 30, rather than the air mass contained in the entire slot. By utilizing the inwardly flared configuration of this invention, it is possible to increase the Helmholtz resonance frequency of a block 12 by approximately 20 percent.

With reference to FIG. 3, the slot can be described in terms of the following parameters: an exterior aperture width W, a throat section depth D, a shell thickness T, and a slot taper angle $\theta$ lying between the flared slot wall and a line normal to the face of the front wall 24. It has been experimentally determined that for a shell thickness T of 1 to 1½ inches, the effective transmission of sound waves in range of 100 to 2,000 Hz requires an aperture width in the range of ¼ to 1 inch. The throat depth D is preferably small compared to the shell thickness, a typical value being one-fourth inch. The feasability of an even shorter throat is limited by molding problems and the fragility of the exterior edge of the slot.

It has also been found that a maximum increase in the resonant frequency occurs for values of $\theta$ above 20°. At lesser values, the effective air mass approaches that of a conventional parallel sided slot. Above 20°, the effective air mass is limited to that found in the throat section 30, rather than the entire slot 28. A recommended range of values for $\theta$ is 25° to 30°, and preferably approximately 27°. As the taper angle is increased above this value range, the absorption effectiveness at higher frequencies decreases, and the structural strength of the block is impaired since the front wall 24 becomes increasingly thinner.

The shift in the Helmholtz frequency introduced by the slot taper is especially significant in maximizing the Noise Reduction Coefficient (NRC) rating of the block 12. This rating is used by the Acoustical and Insulation Materials Association to evaluate sound absorbing materials. It is computed by taking the arithmetic average of the statistical absorbtion coefficients of a material at 250, 500, 1,000 and 2,000 Hz. It is therefore highly advantageous to shift an absorption peak to coincide with these frequencies, and thereby achieve an increase in the NRC rating.

FIG. 4 shows another embodiment of this invention, a three cavity block 12 having two half-tapered slots 34 communicating between the end cavities 14 and the impinging sound energy. The side of each slot 34 lying near the partition walls 22 is flat and perpendicular to the front wall 24. The other side of each slot 34 has a tapered shape like that of the slots 28. The slot has a constant width throughout the throat section 30 that extends from the exterior surface of the front wall 22 for a distance D, and an inwardly flared section 32 defined by the tapered wall portion 36. A half tapered slot of this design is approximately half as effective in raising the Helmholtz frequency of the resonator as a full tapered slot 28. However, it does achieve a significant shift in the resonance frequency while allowing the placement of the exterior aperture of the slot adjacent to the partition wall 22. With a full tapered slot 28 this placement would result in one of the slot sides cutting into the junction of the front wall 24 and the partition wall 22. The ability to locate the slot 34 next to a partition gives the block design flexibility and enhances its aesthetic appeal. For example, when the three cavity block illustrated in FIG. 4 is laid up in courses, the pattern formed by the apertures is uniform and rhythmic, yielding an overall aesthetically pleasing structural surface.

The sound absorbing qualities of a block 12 according to this invention can be further improved by inserting in the cavity 14 a low density fibrous filler material 38 such as rock wool or fiber glass. The filler material is especially effective in both broadening and heightening the absorption peak at the Helmholtz resonance. The filler material may fill the cavity, or only a portion of the cavity. The recommended placement of the filler is flush against the interior surface, or mouth, of the slots 28 or 34, as illustrated in FIGS. 2 and 4. It is also recommended that the filler material not extend into the slots 28 or 34 since this results in a significant lowering of the resonant frequency of the cavity.

Figure 5:
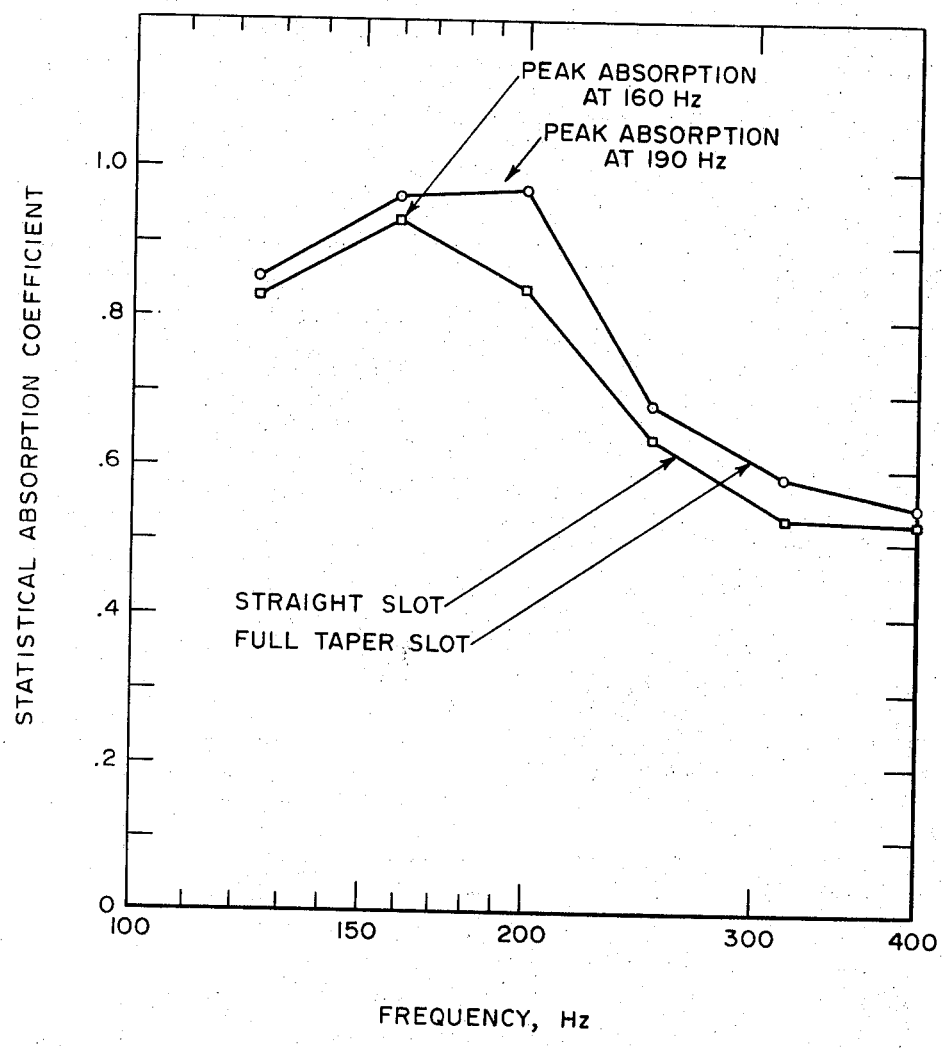
FIG. 5 is a graph showing absorption efficiency as a function of the frequency of the impinging noise for a block of the type shown in FIG. 1 and a conventional block employing a parallel wall slot.

FIG. 5 graphically demonstrates the absorption efficiency of the full taper slot 28 as compared to a conventional parallel wall slot. The vertical axis in FIG. 5 is the statistical absorption coefficient which represents the percentage of the incident sound energy that is absorbed. The term "statistical" means the absorption coefficient values are statistically adjusted to account for variations in the angle of incidence of the sounds which occur in normal usage. The horizontal axis represents the frequency of the impinging sound. The plotted points were determined experimentally using an 8 inch, two cavity block of the type shown in FIG. 2. The block composition was a dense, sand-gravel aggregate which has a lower overall absorption, but tends to sharpen the absorption peak. The block had a shell thickness T of 1¼ inch, a slot width W of ¾ inch, a throat depth D of ¼ inch, and a taper angle $\theta$ of 27°. The tests were conducted by a nationally recognized acoustical laboratory in a reverberation room to closely approximate actual operating conditions. The graphs indicate that the tapered slot 28 increases the resonant frequency from 160 Hz (for a conventional parallel sided slot) to 190 Hz, an increase of approximately 19 percent.

Alternate slot configurations can be employed provided they utilize a section of relatively narrow width combined with an inwardly flaring section. Some examples of suitable forms include a compound curve, an arc of a circle or a T-shaped cross section. If the curved forms are used, the throat section 30 will not have a constant width, but the curvature over the distance D is relatively small so that this section is substantially constant in width and closely approximates the performance of a parallel wall throat section. The slots may also vary in length, initiating at the bottom surface 26, but not extending the full depth of the cavity 14 to the interior surface of the top wall 18. It should be further noted that due to the taper of the cavity 14, the slot width and shell thickness dimensions will vary somewhat depending on the vertical position at which the measurement is taken. The illustrative dimensions given hereinabove are taken at the bottom surface 26.

Other variations within the scope of this invention include blocks having either one cavity, or more than three cavities and blocks of different face dimensions and cavity sizes. For example, blocks having the same face dimensions as the 8 inch block described above with reference to FIG. 5, but with a shorter distance between their front and back walls, will have absorption peaks at higher frequencies since the Helmholtz resonance frequency is inversely proportional to the square root of the cavity volume.

There has been disclosed a sound absorbing structural block that utilizes an inwardly flared slot to raise the Helmholtz resonance frequency of the block and is easier to manufacture, with fewer molding rejects, than outwardly flared slots. The structural block disclosed also has the advantage of presenting a relatively small aperture at its exterior surface thereby deterring the insertion of refuse into the cavity of the block, or damage to the filler materials with pencils and the like. Further, this invention permits a wide latitude in slot location thus facilitating an aesthetically pleasing pattern of apertures when the blocks form a structural element such as a wall or ceiling. Finally, there has been disclosed a sound absorbing block that presents a flat surface to the impinging sound that has obvious advantages for cleaning and painting purposes. Various modifications will become apparent to those skilled in the art from the foregoing description and accompanying drawings. Such modifications are intended to fall within the scope of the appended claims.

What is claimed is:

1. Means for absorbing sound energy in a block of molded structural material having a cavity, one wall of said block having an exterior surface facing a source of said sound energy, comprising at least one elongated slot in said wall extending in length for a distance substantially coextensive with the depth of said cavity, said slot extending in depth from said exterior surface to said cavity, said slot having a variable width increasing from said exterior surface to said cavity except for a section adjacent to said exterior surface having a substantially constant width.

2. Sound absorbing means according to claim 1 wherein said increasing width is a linear function of the distance from the interior edge of said constant width section to said cavity.

3. Sound absorbing means according to claim 2 further characterized by at least one side of said slot having a tapered section forming an angle of 25° to 30+ with a vertical plane perpendicular to said wall.

4. A sound absorptive block of molded structural material having a cavity, a pair of opposite closed walls, third and fourth contiguous closed outer walls each contiguous with each of the end walls, a side having an opening opposite the third wall and extending to the cavity, and a fifth outer wall opposite the fourth wall, having an exposed surface facing the direction of noise to be absorbed and having a slot therein leading to the cavity, said slot being elongated and extending a distance substantially coextensive with the depth of said cavity, and said slot having a variable width increasing from said exterior surface to said cavity except for a section adjacent to said exterior surface having a substantially constant width.

5. A sound absorptive block according to claim 4 wherein said increasing width is a linear function of the distance from the interior edge of said constant width section to said cavity.

6. A sound absorptive block according to claim 5 further characterized by a first side of said slot being substantially flat and perpendicular to said fifth wall and a second side opposite said first side and having a tapered section forming an angle of 25° to 30° with said first side.

7. A sound absorptive block according to claim 5 wherein said first side has a tapered section that mirrors said tapered section of said second side.

8. A sound absorptive structural block according to claim 4 further characterized by at least one additional cavity, said additional cavity having at least one said variable width slot.

9. A sound absorptive block according to claim 5 wherein said slot width at said exposed surface is in the range of one quarter to one inch and said constant width section has a depth of at least one quarter inch.

* * * * *

PO-1050
(5/69)

UNITED STATES PATENT OFFICE
CERTIFICATE OF CORRECTION

Patent No. 3,837,426      Dated September 24, 1974

Inventor(s) Klaus Kleinschmidt

It is certified that error appears in the above-identified patent and that said Letters Patent are hereby corrected as shown below:

Column 1, line 63, cancel "abosrbing" and substitute --absorbing--. Column 6, line 26, cancel "30+" and substitute --30°--.

Signed and sealed this 3rd day of December 1974.

(SEAL)
Attest:

McCOY M. GIBSON JR.
Attesting Officer

C. MARSHALL DANN
Commissioner of Patents